(12) United States Patent
Brimer et al.

(10) Patent No.: US 12,032,596 B1
(45) Date of Patent: Jul. 9, 2024

(54) SYSTEM AND METHOD FOR MANAGING STORAGE OF PARTITIONED DATASETS IN A DISTRIBUTED DATABASE

(71) Applicant: monday.com Ltd., Tel Aviv (IL)

(72) Inventors: Liran Brimer, Ramat Gan (IL); Omer Doron, Tel Aviv (IL)

(73) Assignee: monday.com Ltd., Tel Aviv (IL)

( * ) Notice: Subject to any disclaimer, the term of this patent is extended or adjusted under 35 U.S.C. 154(b) by 0 days.

(21) Appl. No.: 18/091,461

(22) Filed: Dec. 30, 2022

(51) Int. Cl.
*G06F 16/27* (2019.01)
*G06F 16/23* (2019.01)

(52) U.S. Cl.
CPC ........ *G06F 16/278* (2019.01); *G06F 16/2308* (2019.01)

(58) Field of Classification Search
None
See application file for complete search history.

(56) References Cited

U.S. PATENT DOCUMENTS

| | | | |
|---|---|---|---|
| 2005/0203973 A1* | 9/2005 | Yagawa | G06F 11/2094 |
| 2012/0254174 A1* | 10/2012 | Mitra | G06F 12/126 |
| | | | 707/E17.046 |
| 2012/0278587 A1* | 11/2012 | Caufield | G06F 9/505 |
| | | | 711/E12.002 |
| 2019/0095485 A1* | 3/2019 | Bauer | G06F 16/2228 |
| 2019/0303021 A1* | 10/2019 | Favre-Felix | G06F 3/0617 |
| 2021/0165805 A1* | 6/2021 | Xie | G06F 16/278 |
| 2023/0129468 A1* | 4/2023 | Liu | G06F 16/24542 |
| | | | 707/715 |

* cited by examiner

*Primary Examiner* — Augustine K. Obisesan

(57) ABSTRACT

Disclosed herein is a system, comprising a distributed database comprising a plurality of partitions allocated in memory for storing a plurality of datasets. Wherein each dataset stored in the distributed database comprises at least a primary data portion stored in a respective primary partition of the plurality of partitions and at least zero additional data portions stored in respective secondary partitions of the plurality of partitions. Wherein each data portion of each dataset is mapped to a respective partition in which it is stored by a respective identifier. Wherein the primary data portion of each dataset comprises metadata stored in the primary partition, the metadata is indicative of the identifier of all additional data partitions of the respective dataset.

20 Claims, 5 Drawing Sheets

SYSTEM AND METHOD FOR MANAGING STORAGE OF PARTITIONED DATASETS IN A DISTRIBUTED DATABASE

BACKGROUND

The present invention, in some embodiments thereof, relates to storing datasets in a distributed database and, more specifically, but not exclusively, to storing datasets in a distributed database by segmenting each dataset to one or more data portions stored in respective partitions of the database and associating a primary portion of each dataset with metadata mapping all additional portions of the respective dataset to secondary partitions.

Data storage is the corner stone for practically any application, service, platform and/or infrastructure in the present information driven era. Data storage systems, for example, databases, datacenters, cloud storage services and/or the like may be therefore essential to maintain the need for storing data.

Databases have proven to be highly efficient for data storage and with constant demand for additional storage space, much research and innovation is invested to improve database architecture and capabilities to address diverse requirements, such as, for example, robustness, reliability, efficiency and capability typically coupled with the need to ensure integrity, consistency, security and often privacy of the stored data.

Efficiency of database systems may be measured in a plurality of aspects and terms, for example, capacity, integrity, scalability, recoverability, and/or the like. Another key factor which is of great significance is the performance of the database system which may be expressed in one or more parameters, for example, latency, access time, bandwidth, and/or the like.

SUMMARY

According to a first aspect of the present invention there is provided a system, comprising a distributed database comprising a plurality of partitions allocated in memory for storing a plurality of datasets. Wherein each dataset stored in the distributed database comprises at least a primary data portion stored in a respective primary partition of the plurality of partitions and at least zero additional data portions stored in respective secondary partitions of the plurality of partitions. Wherein each data portion of each dataset is mapped to a respective partition in which it is stored by a respective identifier. Wherein the primary data portion of each dataset comprises metadata stored in the primary partition, the metadata is indicative of the identifier of all additional data partitions of the respective dataset.

According to a second aspect of the present invention there is provided a computer implemented method of storing datasets in a distributed database, comprising:

Receiving a plurality of datasets for store in a distributed database deployed comprising a plurality of partitions allocated in memory for storing a plurality of datasets.

Segmenting each of the plurality of datasets to a respective primary data portion and at least zero respective additional data portions according to a size of the respective dataset.

Writing the respective primary data portion of the respective dataset in a respective primary partition of the plurality of partitions allocated for the respective dataset.

Writing each additional data portion of the respective dataset in a respective secondary partition of the plurality of partitions allocated for the respective dataset, each additional data portion is mapped to the respective secondary partition by a respective identifier.

Updating metadata of the primary data portion of the respective dataset to include the identifiers of all additional data portions of the respective dataset. The metadata is stored in the respective primary partition allocated for the respective dataset in association with the primary data portion of the respective dataset.

In a further implementation form of the first, and/or second aspects, the respective identifier of the primary portion of the respective dataset mapping the respective primary portion to a respective primary partition further serves as an identifier of the entire respective dataset.

In a further implementation form of the first, and/or second aspects, each of the plurality of partitions is allocated a predefined size for storing a respective data portion of a respective dataset.

In a further implementation form of the first, and/or second aspects, the plurality of partitions are deployed across a plurality of concurrently accessible clusters such that multiple data portions of a respective dataset are accessible concurrently.

In a further implementation form of the first, and/or second aspects, the additional data portions of a respective dataset are stored in consecutive partitions.

In a further implementation form of the first, and/or second aspects, a read cycle for fetching a respective dataset from the distributed database comprises, reading the primary data portion of the respective dataset from its respective primary partition, and analyzing the metadata of the primary data portion to identify each additional data portion of the respective dataset. Responsive to detecting that the respective dataset comprises only the primary data portion, completing the read cycle. Responsive to detecting that the respective dataset comprises one or more additional data portions, reading all of the additional data portions of the respective dataset from the respective secondary partitions according to the identifiers extracted from the metadata which map each additional data portion to a respective secondary partition.

In a further implementation form of the first, and/or second aspects, in case the respective dataset comprises a plurality of additional data portions, the plurality of additional data portions are read concurrently from multiple respective second partitions.

In a further implementation form of the first, and/or second aspects, a write cycle for storing a new dataset to the distributed database comprises, determining, based on a size of the new dataset, whether the new dataset comprises a single data portion or a plurality of data portions. Responsive to determining that the new dataset comprises a single data portion, storing the new dataset by updating metadata of a primary data portion of the new dataset to indicate the new dataset has no additional data portions, and writing the primary data portion including its metadata in a respective primary partition allocated for the new dataset. Responsive to determining that the new dataset comprises a plurality of data portions, storing the new dataset by writing each additional data portion of the new dataset in a respective secondary partition of the plurality of partitions allocated for the new dataset, each additional data portion of the new dataset is mapped to the respective secondary partition by a respective identifier, updating the metadata of the primary data portion of the new dataset to include the identifier of each additional data portion of the new dataset, and writing the primary portion including its metadata in the respective primary partition.

In a further implementation form of the first, and/or second aspects, in case the new dataset comprises a plurality of additional data portions, the plurality of additional data portions are written concurrently to multiple respective secondary partitions.

In a further implementation form of the first, and/or second aspects, a write cycle for updating a respective dataset stored in the distributed database with an update dataset comprises determining, based on a size of the update dataset, whether the update dataset comprises a single data portion or a plurality of data portions. Responsive to determining that the update dataset comprises a single data portion, storing the update dataset by updating metadata of a primary data portion of the update dataset to indicate the update dataset has no additional data portions, and writing the primary data portion including its metadata in a respective primary partition storing the stored dataset to overwrite the stored dataset. Responsive to determining that the updated dataset comprises a plurality of data portions, storing the update dataset by writing each additional data portion of the update dataset in a respective one of a plurality of secondary partitions allocated for the update dataset which is different from the respective secondary partition storing an additional data portion of the stored dataset, the respective additional data portion of the updated dataset is mapped to the respective different secondary partition by a respective new identifier, updating metadata associated with the primary data portion of the update dataset to indicate the new identifier of each additional data portion of the update dataset, and writing the primary portion of the update dataset including its associated metadata in the respective primary partition storing the stored dataset to overwrite the primary data partition of the stored dataset.

In a further implementation form of the first, and/or second aspects, in case the update dataset comprises a plurality of additional data portions, the plurality of additional data portions are written concurrently to multiple respective secondary partitions.

In a further implementation form of the first, and/or second aspects, the additional portions partitions of the stored dataset are discarded after a predefined time period to release the respective secondary partitions.

In an optional implementation form of the first, and/or second aspects, a plurality of write cycles for updating one or more datasets stored in the distributed database are accumulated according to one or more accumulation rules and initiating the accumulated write cycles when one or more of the accumulation rules are fulfilled.

In a further implementation form of the first, and/or second aspects, one or more of the accumulation rules define a certain timing for accumulating write cycles.

In a further implementation form of the first, and/or second aspects, one or more of the accumulation rules define a certain number of accumulated write cycles.

In an optional implementation form of the first, and/or second aspects, one or more lock mechanisms are applied during each of the accumulated write cycles to prevent simulations access of multiple write cycles to a common dataset.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1A:
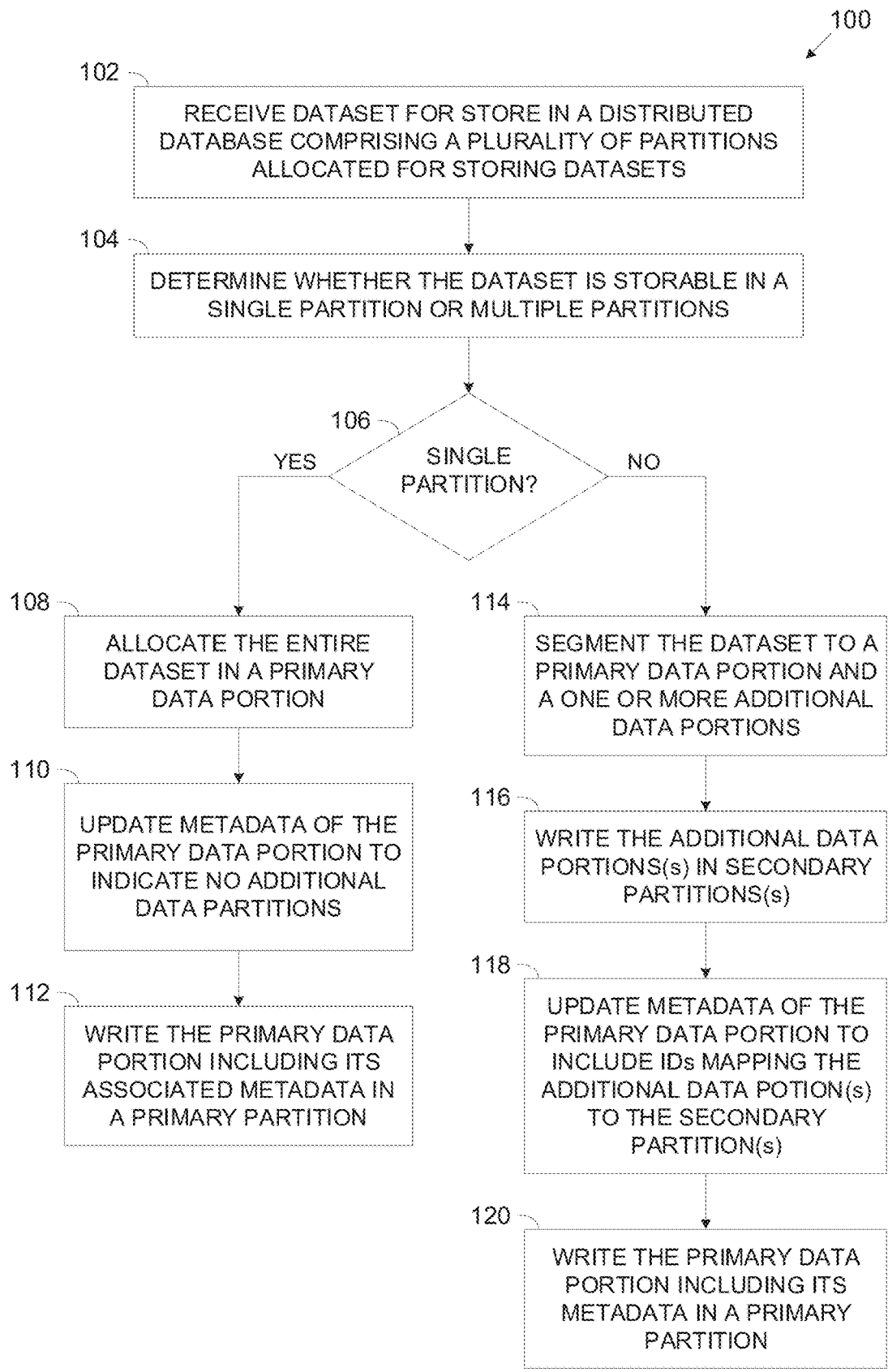
FIG. 1A and FIG. 1B are flowcharts of exemplary processes of storing and fetching datasets in and from a distributed database comprising a plurality of partitions, according to some embodiments of the present invention.

The present invention, in some embodiments thereof, relates to storing datasets in a distributed database and, more specifically, but not exclusively, to storing datasets in a distributed database by segmenting each dataset to one or more data portions stored in respective partitions of the database and associating a primary portion of each dataset with metadata mapping all additional portions of the respective dataset to secondary partitions.

According to some embodiments of the present invention, there are provided methods, systems and computer program products for storing datasets in a distributed database comprising a plurality of partitions allocated for storing the datasets in a memory hosting the distributed database.

One or more distributed databases for example, an SQL database, a NoSQL database, a NewSQL database, and/or the like may be configured for storing a plurality of datasets, for example, tables, columns, rows, entries, and/or the like. The distributed database(s) may be controlled and managed by one or more Database Management Systems (DBMS), for example, Apache Cassandra, ScyllaDB, Aero spike, Amazon Keyspaces, Bigtable, Datastax, HBase, and/or the like.

The distributed database(s) and its DBMS may be typically deployed across a plurality of concurrently accessible storage clusters which may be accessed simultaneously for read and/or write accesses (queries).

As such, the partitions of the distributed database may be allocated over the storage clusters in an arrangement making them concurrently accessible partitions which are distinct and independent of each other and may be therefore accessed simultaneously.

Each of the partitions allocated in the distributed database may have a predefined size, for example, 512 KB, 1 MB, 2 MB, 5 MB, and/or the like. Each dataset stored in the distributed database may be therefore segmented, based on its size compared to the partition size, and stored in one or more partitions of the of the plurality of partitions of the distributed database which are allocated for storing the respective dataset.

However, regardless of its size, each dataset may comprise at least one data portion stored in a respective primary partition of the distributed database. Larger datasets may comprise one or more additional data portions stored in respective secondary partitions of the distributed database. Each dataset stored in the distributed database may therefore have a primary data portion stored in a respective primary partition and zero or more additional data portions stored in respective secondary partitions.

Moreover, the primary data portion of each dataset may comprise metadata stored in its respective primary partition in association with the primary data portion. The metadata may comprise at least an identifier of each additional data portion of the receptive dataset which maps the respective additional data portion to a respective secondary partitions.

Each read access (query) to a receptive dataset stored in the distributed database may therefore comprise an access to the primary partition to retrieve the primary data portion of the respective dataset and its associated metadata. The metadata of the primary portion may be analyzed to determine if the respective dataset comprises additional data portions and, in case it does, determine the mapping of the additional data portions to respective secondary partitions based on the identifiers extracted from the metadata. The respective secondary partition(s) may be then accessed, optionally concurrently, to retrieve the additional data portions. The primary data portion and the secondary data portions (id exits) may be then merged to reconstruct the complete requested dataset which may be provided in response to the query.

When storing a new dataset in the distributed database, i.e., a dataset which is stored in the distributed database for the first time, the new dataset may be first segmented to one or more data portions according to its size compared to the partition size. In case the new dataset may be stored in a partition, the new dataset may not be segmented as it may comprise only a primary data portion which may be stored in a respective primary partition. The metadata of the primary data portion of such single-portion datasets may be updated to indicate the respective dataset does not include additional data portions.

However, in case the new dataset requires multiple (two or more) partitions for storing it in the distributed database, the new dataset may be segmented to a primary data portion which may be stored in a respective primary partition and one or more additional data portions which may be stored in one or more respective secondary partitions. The metadata of the primary data portion of such multi-portion datasets may be updated to indicate the identifiers of all additional data portions mapping each additional data portion to a respective secondary partition.

The process and/or algorithm for storing an update dataset in the distributed database, i.e., a dataset which replaces a corresponding dataset (already) stored in the distributed database is slightly different from storing a new dataset for the first time.

In case of single-portion datasets, the primary data portion of a new dataset may be written to a free primary partition which does not store data of any other dataset. In contrast, in case of single-portion datasets written to replace corresponding datasets stored in the distributed database, the primary data portion of an update dataset may be written to the same primary partition storing the primary portion of the replaced dataset thus overwriting it.

The storing process is different between new datasets and update datasets also for multi-portion datasets written to replace corresponding datasets stored in the distributed database. A multi-portion dataset may require multiple (two or more) partitions for storing it, and the dataset may be therefore segmented to a primary data portion and one or more additional data portions. In case of a new dataset, the plurality of data portions, both the primary data portion and the additional data portion(s) may be stored in free primary partition which does not store data of any other dataset. However, in case of an update dataset, the additional data portions are first written into one or more respective secondary partitions which are free and are therefore different from the secondary partitions storing the additional data portions of the replaced dataset such that the (new) additional data portion(s) of the update dataset do not overwrite the (old) additional data portion(s) of the replaced dataset. Rather the additional data portions of both the update dataset and the replaced dataset co-exist at least for a predefined time period.

The metadata of the primary data portion of the update dataset may be updated to indicate the (new) identifiers of all additional data portions mapping each additional data portion in a respective secondary partition and the primary data portion may be written with its metadata in a respective primary partition. Specifically, the primary data portion of the (new) update dataset may be written in the primary partition storing to the same primary partition storing the primary portion of the replaced dataset thus overwriting it the primary data portion of the (old) replaced dataset.

The additional datasets of the replaced dataset may be discarded after a predefined time period, for example, 15 seconds, 30 seconds, 60 seconds, and/or the like to enable read (query) accesses to the distributed database which are in progress during the update process to complete. The additional data portions of the (old) replaced dataset and the additional data portions of the (new) update dataset therefore co-exist for the predefined time interval.

As such, the update process for updating a dataset stored in the distributed database is practically an atomic operation since as long as the primary data portion of the update dataset is not written to overwrite the primary data portion of the replaced dataset, all data portions, i.e., primary and additional data portions, of the replaced dataset are available for read (query) accesses. Once, the atomic operation of overwriting the primary data portion of the replaced dataset with the primary data portion of the update dataset, only the updated dataset is accessible while the replaced dataset is no longer accessible.

Optionally, a plurality of write cycles for writing new and/or update datasets to the distributed database are accumulated, for example, in a buffer, and written to the distributed database when reaching one or more accumulation thresholds and/or fulfilling one or more accumulation criteria which may be based on timing, volume, and/or the like.

Optionally, one or more lock mechanism may be applied for locking the distributed database and/or part thereof when writing one or more datasets to the distributed database.

Storing the primary portion of each dataset in the distributed database together with its metadata may present significant benefits and advantages compared to existing distributed databases systems.

First, since the metadata relating to each dataset is stored in a respective primary partition allocated in the distributed database in association with the primary data portion of the respective dataset, i.e., integrated with the primary data portion, a single query, i.e., read cycle (access) to the respective primary partition may retrieve the primary data portion and its metadata indicative of whether the respective dataset comprises additional data portions or not. The integrated metadata architecture may significantly improve access performance, for example, reduce query count compared to existing partitioned database systems in which the metadata is typically stored separately from the datasets thus requiring separate queries (read cycles) for retrieving the dataset and its metadata.

Moreover, since a plurality of secondary partitions may be accessed concurrently, in case a certain queried (read) dataset comprises multiple additional data portions stored respectively in multiple respective secondary partitions, the multiple secondary partitions may be accessed concurrently to simultaneously retrieve all additional data of the respective dataset.

Furthermore, since updating a dataset in the distributed database is an atomic operation, data integrity is ensured for each read (query) cycle conducted to the distributed database including such read cycles which are initiated to retrieve datasets during the time of updating the very same datasets. This is since up until the atomic operation of overworking the primary data portion of a replaced dataset with the primary data portion of a replacing dataset (update dataset), the read access may retrieve the previously (old) stored dataset, and once the primary data portion of the replacing dataset is written to overwrite the primary data portion of the replaced dataset, the read cycle may retrieve the new updated dataset.

In addition, accumulating a plurality of write and/or update cycles and initiating the accumulated cycles together may significantly reduce risk of racing between simultaneous update and read cycles thus further reducing the risk of data confection for the read cycles.

Also, applying the lock mechanism(s) to lock one or more of the partitions when writing one or more datasets may further increase reduce risk of racing between simultaneous write cycles and/or between simultaneous update and read cycles.

Finally, while the additional data portions of a replaced dataset are stored for a certain time period to support atomicity the update process and ensure data integrity for read cycles, the additional data portions are eventually discarded, when no longer needed, in order to release the partitions storing them and make them available for storing other datasets Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1B:
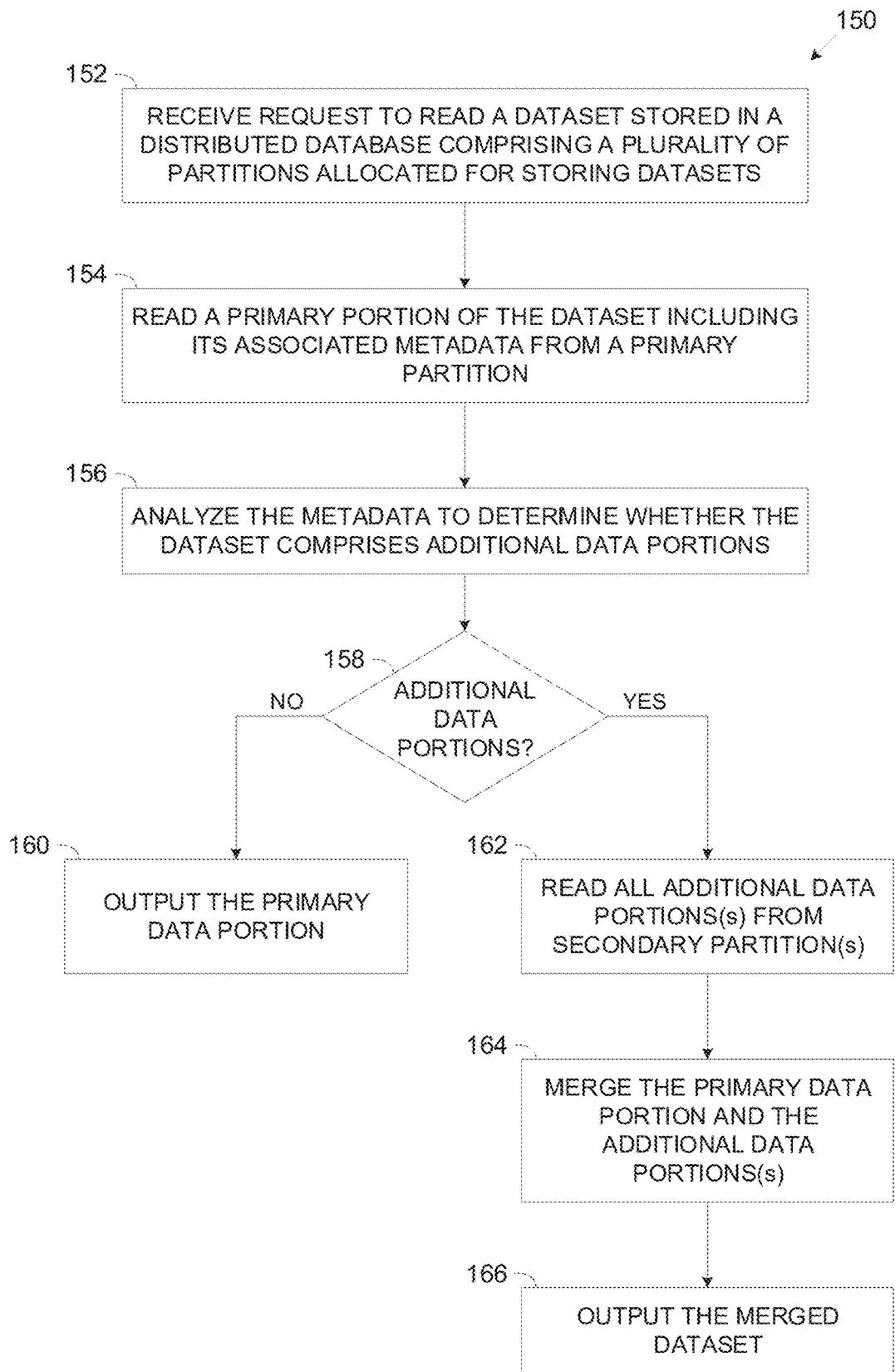

Referring now to the drawings, FIG. 1A and FIG. 1B are flowcharts of exemplary processes of storing and fetching datasets in and from a distributed database comprising a plurality of partitions, according to some embodiments of the present invention.

An exemplary process 100 may executed a write cycle for storing one or more datasets in a distributed database comprising of a plurality of partitions such that each dataset may be allocated one or more partitions. Moreover, the plurality of partitions storing each dataset may be concurrently accessible partitions which may be accessed simultaneously independently of each other.

Each dataset stored in the distributed database may be therefore segmented, based on its size, to one or more data portions, specifically at least a primary data portion and zero or more additional data portions.

The primary data portion of each dataset is stored in a primary partition allocated for the respective dataset from the plurality of partitions of the distributed database. Each additional data portion of the respective dataset, if exists, is stored in a respective one of a plurality of secondary partitions allocated for the respective dataset from the plurality of partitions of the distributed database.

Moreover, the primary data portion of each dataset may comprise metadata stored in its respective primary partition in association with the primary data portion. The metadata may comprise at least an identifier mapping each additional data portion of the receptive dataset in a respective one of the secondary partitions.

An exemplary process 150 may execute a read cycle for retrieving (fetching) one or more datasets stored in the distributed database.

Each read access to a receptive stored dataset may comprise accessing the primary partition of the respective dataset to retrieve its primary data portion, determining whether the receptive dataset has additional data portions, and accessing accordingly one or more of the secondary partitions of the respective dataset, according to the mapping identifier(s) extracted from the metadata of the dataset's primary portion, to retrieve the additional data portion(s) of the respective dataset.

Figure 2:
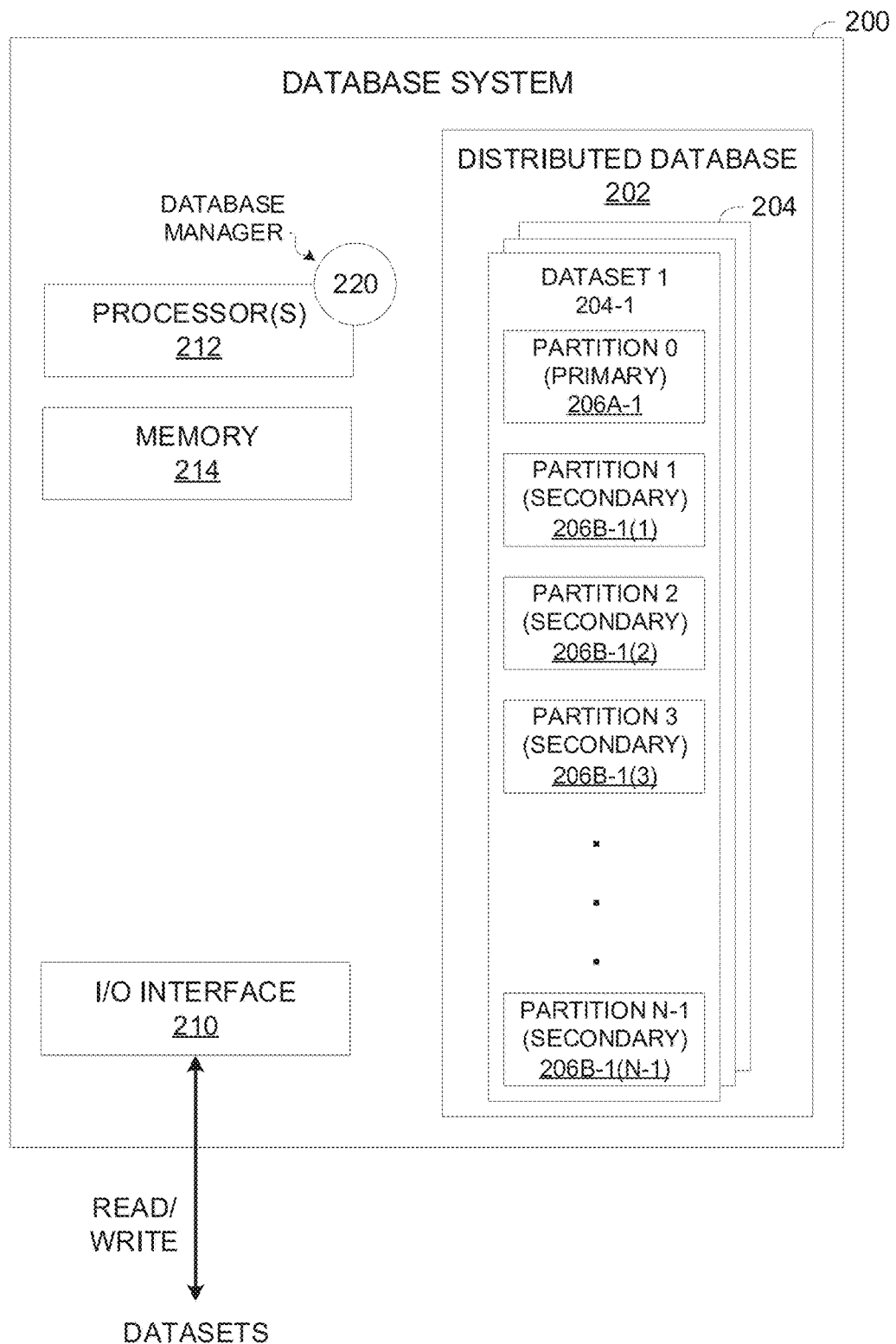
FIG. 2 is a schematic illustration of a system for storing and fetching datasets in and from a distributed database comprising a plurality of partitions, according to some embodiments of the present invention.

Reference is also made to FIG. 2, which is a schematic illustration of a system for storing and fetching datasets in and from a distributed database comprising a plurality of partitions, according to some embodiments of the present invention.

An exemplary database system 200, for example, a server, a computing node, a cluster of computing nodes, a cloud platform, a cloud service, a datacenter, and/or the like, interchangeably designated Database Management System (DBMS), may comprise a distributed database 202, for example, an SQL database, a NoSQL database, a NewSQL database, and/or the like configured for storing a plurality of datasets, for example, tables, columns, rows, entries, and/or the like.

In particular, the distributed database 202 managed by the database system 200, for example, Apache Cassandra, ScyllaDB, Aerospike, Amazon Keyspaces, Bigtable, Datastax, HBase, and/or the like may be deployed across a plurality of concurrently accessible storage clusters which may be accessed simultaneously for read and/or write accesses. For example, the distributed database 202 may be utilized by a cluster of multiple storage servers (also known as commodity servers) which may be accessed concurrently where each server may host a respective segment of the distributed database 202. In another example, the distributed database 202 may be utilized by a plurality of separate hard drives which may be accessed concurrently where each hard drive may host a respective segment of the distributed database 202.

The database system 200 may comprise an Input/Output (I/O) interface 210 for receiving and/or outputting datasets stored in the distributed database 202, a processor(s) 212 for executing the processes 100 and 150, and a memory 214 for storing data and/or code (program store).

The I/O interface 210 may comprise one or more communication channels, interconnections, buses and/or the like for connecting to one or more other devices, systems, platforms, services, and/or the like collectively designated database clients herein after. Via the I/O interface 210, one or more of the database clients may therefore provide data to the database system 200 for storage in the distributed database 202. Via the I/O interface 210, one or more of the database clients may also request the database system 200 to retrieve and output one or more datasets 204 stored in the distributed database 202.

The I/O interface 210 may comprise one or more communication channels, interconnections, buses and/or the like such as, for example, PCI-e, InfiniBand, switch fabric Ethernet, and/or the like through which the database system 200 may connect to one or more close proximity storage client devices for example, an on-board device, an on-site device, and/or the like.

The I/O interface 210 may further comprise one or more wired and/or wireless interfaces for connecting to one or more wired and/or wireless networks, for example, Local Area Network (LAN), Wireless LAN (WLAN, e.g. Wi-Fi), Wide Area Network (WAN), Metropolitan Area Network (MAN), cellular network, the internet and/or the like. Via the network interface(s), the database system 200 may connect to one or more remote database client devices, systems, platforms and/or services, for example, a remote server, a cloud service, a datacenter, a remote client device (e.g., computer, Smartphone, tablet, etc.), and/or the like.

The processor(s) 212, homogenous or heterogeneous, may include one or more processing nodes and/or cores arranged for parallel processing, as clusters and/or as one or more multi core processor(s). The memory 214 may include one or more non-transitory persistent storage devices, for example, a ROM, a Flash array, a Solid State Drive (SSD), a hard drive (HDD) and/or the like. The memory 214 may also include one or more volatile devices, for example, a RAM, a cache, and/or the like. The memory 214 may further comprise one or more local and/or remote network storage resources, for example, a storage server, a Network Attached Storage (NAS), a network drive, a cloud storage service and/or the like accessible via the I/O interface 210.

The processor(s) 212 may execute one or more software modules, for example, a process, a script, an application, an agent, a utility, a tool, an Operating System (OS), a service, a plug-in, an add-on and/or the like each comprising a plurality of program instructions stored in a non-transitory medium (program store) such as the memory 214 and executed by one or more processors such as the processor(s) 212.

Optionally, the processor(s) 212 may include, utilize and/or apply one or more hardware elements available in the database system 200, for example, a circuit, a component, an Integrated Circuit (IC), a Field Programmable Gate Array (FPGA), an Application Specific Integrated Circuit (ASIC), a Digital Signals Processor (DSP), a Graphic Processing Unit (GPU), an Artificial Intelligence (AI) accelerator and/or the like.

The processor(s) 212 may therefore execute one or more functional modules utilized by one or more software modules, one or more of the hardware modules and/or a combination thereof. For example, the processor(s) 212 may execute a database manager 220, interchangeably designated DBMS, for managing access to the distributed database 202.

The distributed database 202 may comprise a plurality of partitions 206 allocated in the distributed database 202 for storing a plurality of datasets 204. Specifically, the plurality of partitions 206 are allocated in a memory, for example, the storage clusters hosting the distributed database 202.

In particular, each dataset 204 may be stored in one or more respective partitions 206 allocated specifically for the respective dataset 204. This means that a respective set of partitions 206 is allocated for storing each dataset 204 where the number of partitions in each set is set according to a size of the respective dataset 204 it stores compared to a partition size defined for each of the plurality of partitions 206. As such each partition 206 may either store a certain dataset and/or part thereof or it may be free and thus available for allocation to store a dataset 204 and/or part thereof.

Moreover, a plurality of respective partitions 206 allocated to store a respective dataset 204 may be deployed across the plurality of storage clusters such that multiple partitions 206 storing the respective dataset 204 may be accessed concurrently independently of each other such that multiple and potentially all the partitions 206 storing the respective dataset may be accessed simultaneously at the same time. This concurrently accessible partitions approach may be expanded to a plurality of datasets 204 and optionally to all datasets 204 stored in the distributed database 202.

The datasets 204 stored in the distributed database 202 may be segmented to one or more data portions each stored in a respective partition 206. Specifically, each dataset 204 is segmented to one or more data portions according to the size of the dataset compared to the size allocated for each partition 206.

Regardless of its size, each dataset 204 stored in the distributed database 202 may comprise a primary data portion stored in a primary partition 206A allocated to store the respective dataset 204. Datasets 204 which are smaller and/or equal to the partition size may fit in a single partition 206 and may therefore comprise only the primary data portion stored in a respective primary partition 206A.

However, datasets 204 which are bigger than the partition size may not fit in a single partition 206 and may be therefore segmented to a primary data portion stored in a respective primary partition 206A allocated to store the respective dataset 204 and one or more additional data portions each stored in a respective secondary partition 206B allocated to store the respective dataset 204. The number of additional data portions of a respective dataset 204 may depend on its size compared to the partition size. In case a respective dataset 204 comprises multiple additional data portions, the additional data portions may be stored in successive secondary partitions 206B.

For example, an exemplary dataset 204-1 stored in the distributed database 202 may have a size fitting in N partitions 206 and may be therefore segmented to N data portions, specifically a primary data portion stored in a respective primary portion 206A1 allocated for storing the dataset 204-1 and N−1 additional data portions stored in N−1 respective secondary partitions 206B1(1) to 206B1(N−1) allocated for storing the dataset 204-1.

The partition size of each of the plurality of partitions 206 may be predefined, for example, 512 KB, 1 MB, 2 MB, 5 M, and/or the like according to one or more operational parameters relating to the database system 200, and/or to the data, specifically the datasets stored in the distributed database 202.

For example, the partition size may defined according to on one or more parameters of the database system 200 and/or the distributed database 202, for example, storage technology, storage architecture, capacity, access speed (via the I/O interface 210), and/or the like.

In another example, the partition size may be defined by one or more parameters of the datasets stored in the distributed database 202, for example, a type, a typical size, a maximal size, a structure, and/or the like.

In another example, the partition size may be defined by one or more parameters of one or more client applications using the distributed database 202, for example, size of data chucks typically retrieved and/or written by the client application(s) accessing the database system 200, and/or the like. For example, the partition size may be defined according to the size of the datasets (entities) stored in the database, for example, columns, rows, entries, tables, and/or the like.

In another example, the parameters defining the partition size may relate to one or more performance requirements for retrieving and/or string data in the distributed database 202, for example, data throughput, access latency, access concurrency, and/or the like. For example, in case high throughput and/or low latency are required, the partition size may be reduced to store the datasets in a large number of partitions stored across more concurrently accessible storage clusters thus increasing concurrency of retrieving and/or storing smaller chunks of data (dataset portions).

Each of the primary data portions and the additional data portions of each dataset 204 may be mapped to its primary partition 206A and its secondary partitions 206B respectively by respective identifiers. The identifier of each data portion of each dataset 204 may therefore indicate the partition in which the respective data portion is stored. For example, the identifier of the primary data portion of each dataset 204 may indicate the primary partition 206A storing the primary data portion of the respective dataset 204 and the identifier of each additional data portion of the respective dataset 204 may map a receptive secondary partition 206B in which the respective additional data portion is stored.

The identifier of the primary data portion of each dataset 204 may further serve as the identifier of the entire dataset 204. The identifier of the primary data portion of a respective dataset 204 may be therefore used to query, search, identify and/or access the respective dataset 204 in the distributed database 202.

Since the additional data portions of datasets 204 stored in multiple partitions 206 may be typically stored in successive secondary partitions 206B, the identifiers of the additional data portions may be also consecutive to indicate the successive secondary partitions 206B accordingly.

In order to track each dataset in the distributed database 202, specifically datasets comprising multiple data portions, the primary data portion of each dataset 204 may comprise metadata stored in the primary partition 206A in association with the respective primary data portion. The metadata associated with the respective primary data portion of each dataset 204 may be indicative of, for example, include the identifier of each additional data portion of the respective dataset 204, if such additional data portions exist.

When accessing a respective dataset 204 stored in the distributed database 202, the first read access may be done to retrieve the respective primary data portion of the respective dataset 204 together with its metadata indicative of each additional data portion of the respective dataset 204 and indicative of the identifier mapping of the respective additional data portion in the respective secondary partition 206B. In case, based on analysis of the retrieved metadata, it is determined that the respective dataset 204 compromises one or more additional data portions, one or more additional read accesses may be conducted, optionally concurrently, to read the additional data portion(s) from the secondary partition(s) 206B allocated for storing the receptive dataset 204.

Figure 3:
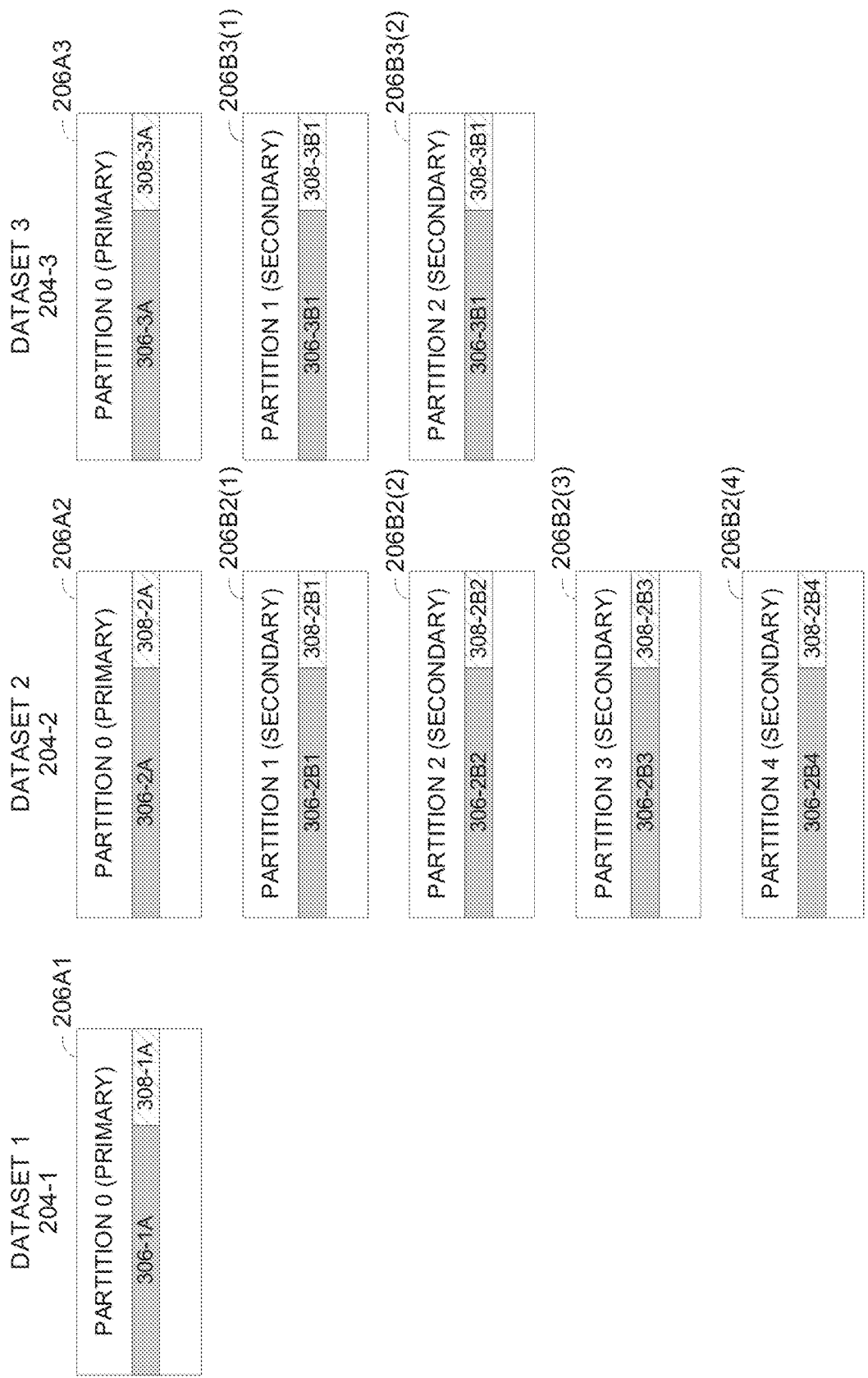
FIG. 3 is a schematic illustration of exemplary datasets stored in a distributed database comprising a plurality of partitions, according to some embodiments of the present invention.

Reference is now made to FIG. 3, which is a schematic illustration of exemplary datasets stored in a distributed database comprising a plurality of partitions, according to some embodiments of the present invention.

An exemplary distributed database such as the distributed database 202 may comprise a plurality of partitions such as the partitions 206 which may be allocated for storing a plurality of datasets such as the datasets 204.

As described herein before, each of the datasets 204 stored in the distributed database 202 may be segmented to one or more data portions according to its size compared to the partition size, for example, 1 MB, 2 MB, 5 MB, and/or the like and stored in one or more partitions 206 accordingly. In particular, each dataset 204 may be segmented to comprise at least a primary data portion and optionally, depending on the size of the respective dataset 204, zero or more additional data portions.

The primary data portion of each dataset 204 may be stored in a respective primary partition 206A allocated for the respective dataset 204 and each additional data portion of the respective dataset 204 may be stored in respective secondary partition 206B allocated for the respective dataset 204, typically in successive (consecutive) order.

For example, a first dataset 204-1 may have a size smaller than the partition size and may be therefore stored in a single partition 206. In particular, the first dataset 204-1 may have only a primary data portion 306-1A which is stored in a respective primary partition (0) 206A1.

A second exemplary dataset 204-2 may have a size between four and five times the partition size and may be therefore segmented to five data portions stored in five different partitions 206. Specifically, the second dataset 304-2 may be segmented to a primary data portion 306-2A and four additional data portions, a first additional data portion 306-2B1, a second additional data portion 306-2B2, a third additional data portion 306-2B3, and a fourth additional data portion 306-2B4. The primary data portion 306-2A may be stored in a respective primary partition (0) 206A2, the first additional data portion 306-2B1 may be stored in a respective secondary partition (1) 206B2(1), the second additional data portion 306-2B2 may be stored in a respective secondary partition (2) 206B2(2), the third additional data portion 306-2B3 may be stored in a respective secondary partition (3) 206B2(3), and the fourth additional data portion 306-2B4 may be stored in a respective secondary partition (4) 206B2(4).

A third exemplary dataset 204-3 may have a size between two and three times the partition size and may be therefore segmented to three portions stored in three different partitions 206. Specifically, the second dataset 304-3 may be segmented to a primary data portion 306-3A and two additional data portions, a first additional data portion 306-3B1, and a second additional data portion 306-3B2. The primary data portion 306-3A may be stored in a respective primary partition (0) 206A3, the first additional data portion 306-3B1 may be stored in a respective secondary partition (1) 206B3(1), and the second additional data portion 306-3B2 may be stored in a respective secondary partition (2) 206B3(2).

Each of the data portions 306 of each of the plurality of datasets 204 stored in the distributed database 202 may be mapped by a respective identifier (ID) to the respective partition 206 storing the respective data portion 306. For example, the primary portion 306A1 of the dataset 204-1 may be mapped by a respective identifier set to '0' to indicate the primary partition (0) 206A(1).

In another example, the primary portion 306-2A of the dataset 204-2 may be mapped by a respective identifier set to '0' to indicate the primary partition (0) 206A2, the first additional portion 306-2B1 of the dataset 204-2 may be mapped by a respective identifier set to '1' to indicate the secondary partition (1) 206B2(1), the second additional portion 306-2B2 of the dataset 204-2 may be mapped by a respective identifier set to '2' to indicate the secondary partition (2) 206B2(2), the third additional portion 306-2B3 of the dataset 204-2 may be mapped by a respective identifier set to '3' to indicate the secondary partition (3) 206B2(3), and the fourth additional portion 306-2B4 of the dataset 204-2 may be mapped by a respective identifier set to '4' to indicate the secondary partition (4) 206B2(4).

In another example, the primary portion 306-3A of the dataset 204-3 may be mapped by a respective identifier set to '0' to indicate the primary partition (0) 206A3, the first additional portion 306-3B1 of the dataset 204-3 may be mapped by a respective identifier set to '1' to indicate the secondary partition (1) 206B3(1), and the second additional portion 306-3B2 of the dataset 204-3 may be mapped by a respective identifier set to '3' to indicate the secondary partition (3) 206B3(2).

The primary data portion 306A of each dataset 204 may comprise, in addition to data of the respective dataset 204, metadata 308A stored in the respective primary partition 206A in association with the respective primary data portion 306A. The metadata 308A may be added to the primary data portion 306A of each dataset 204 stored in a respective primary partition 206A, for example, as an additional field, an additional column, and/or the like.

The metadata 308A associated with the primary data portion 306A of each dataset 204 may be indicative of the identifiers mapping all additional data portions 306B of the respective dataset 204 in respective one or more secondary partitions 206B.

For example, the primary data portion 306-1A of the dataset 204-1 may comprise metadata 308-1A. Since the dataset 204-1 comprises only a single data portion, specifically the primary data portion 306-1A stored in the primary partition 204-1A, the metadata 308-1A may indicate that the dataset 204-1 has no additional data portions. For example, the metadata 308-1A may comprise 'null'.

In another example, the primary data portion 306-2A of the dataset 204-2 may comprise metadata 308-2A indicative of the additional data portions of the dataset 304-2 which are stored in the respective secondary partitions 206B2(1), 206B2(2), 206B2(3) and 206B2(4). The metadata 308-2A may therefore comprise the identifiers '1', '2', '3' and '4'.

In another example, the primary data portion 306-3A of the dataset 204-3 may comprise metadata 308-3A indicative of the additional data portions of the dataset 304-2 which are stored in the respective secondary partitions 204B2(1), and 206B3(2). The metadata 308-3A may therefore comprise the identifiers '1' and '2'.

As described herein before, a different set of partitions 206 is stores each dataset 204 in the distributed database 202. The identifiers mapping the partitions 206 storing each dataset 204 therefore relate only to the partitions 206 of the respective dataset 204. Therefore, while the identifiers may hold similar values (e.g., '0', '1', '2', etc.) for partitions 206 storing different datasets 204, since each set of partitions 206 is separate from any other set of partitions 206, the identifiers of partitions 206 relating to different datasets 204 are separate and do not overlap with each other.

For example, the primary data portion 306-1A is mapped to its primary partition 206A1 by identifier '0', the primary data portion 306-2A is mapped to its primary partition 206A2 by identifier '0', and the primary data portion 306-3A is mapped to its primary partition 206A3 by identifier '0'. However, since the set of partitions 206 storing each of the primary data portions 306-1A, 306-2A, and 306-3A is different from each other the identifiers '0' mapping each of these primary data portions 306-1A, 306-2A, and 306-3A exist in a separate range and therefore do not overlap.

In another example, the first additional data portion 306-2B1 is mapped to its secondary partition 206B2(1) by identifier '1', and first additional data portion 306-3B1 is mapped to its secondary partition 206B3(1) by identifier '1'. However, the identifiers '1' mapping each of these additional data portions 306-2B1, and 306-3B1 exist in a separate range and therefore do not overlap.

Optionally, one or more of the additional data portions 306B of one or more of the datasets 204 may also include metadata 308, designated, metadata 308B. However, the metadata 308B of the additional data portion 306B of the datasets 204 may be typically empty, for example, 'null'. For example, the additional data portion 306-2B1 may comprise metadata 308-2B1, the additional data portion 306-2B2 may comprise metadata 308-2B2, the additional data portion 306-2B3 may comprise metadata 308-2B3, and the additional data portion 306-2B4 may comprise metadata 308-2B4. In another example, the additional data portion 306-3B1 may comprise metadata 308-3B1, and the additional data portion 306-3B2 may comprise metadata 308-3B2.

Reference is made once again to FIGS. 1A-B.

For brevity, the process 100 is described for storing a single dataset 204 to the distributed database 202. This however, should not be construed as limiting since the process 100 may be easily duplicated and/or repeated for writing a plurality of datasets 204 to the distributed database 202.

As shown at 102, the process 100 starts with the database manager 220 receiving a dataset 204 for storage in the distributed database 202.

The write access (cycle) for storing the dataset 204 in the distributed database 202 may be conducted through one or more queries initiated by one or more database clients to the database manager 220 as known in the art. Each query may comprise one or more query keys which may be matched against datasets 204 in the distributed database 202. Such queries may be received via the I/O interface 210 of the database system 200, for example, via one or more networks, interconnections and/or the like. The database manager 220 may optionally respond to the query(s), when receiving it and/or when completing the write cycle, to acknowledge receipt of the query and/or to indicate a result of the query, for example, success, failure, error, status, and/or the like.

As shown at 104, the database manager 220 may determine, based on the size of the received dataset 204, whether the received dataset 204 comprises a single data portion or a plurality of data portions. In particular, the database manager 220 may determine whether the received dataset may be stored in a single partition 206 or does it have to be stored in multiple partitions 206.

As such, in case the size of the received dataset 204 is smaller than the partition size defined for the distributed database 202, the database manager 220 may determine that the received dataset 204 comprise only a single data portion which may be stored in a single partition 206. However, in case the size of the received dataset 204 exceeds the partition size, the database manager 220 may determine that the received dataset 204 comprises a plurality of data portions which should be stored in a plurality of partitions 206.

A shown at 106, which is a conditional step, in case the received dataset 204 is determined to comprise a single data portion, the process may branch to 108 for storing the single-portion received dataset 204. In case the received dataset 204 is determined to comprise a plurality of data portions, the process may branch to 114 for storing the multi-portion received dataset 204.

As shown at 108, since the received dataset 204 comprises a single data portion, the database manager 220 may allocate the entire received dataset in a respective primary data portion.

As shown at 110, since the received dataset has no additional data portions, the database manager 220 may update metadata 308A associated with the primary data portion of the received dataset 204 accordingly to indicate that the dataset 204 has no additional data portions.

As shown at 112, the database manager 220 may write the primary data portion of the received dataset 204 together with its associated metadata in a respective primary partition 206A allocated for storing the received dataset 204.

As shown at 114, since the received dataset comprises a plurality of data portions, the database manager 220 may segment the received dataset 204 to a plurality of data portions according to its size compared to the partition size. Specifically, the database manager 220 may segment the received dataset 204 to a respective primary data portion and one or more respective additional data portions. For example, assuming the size of a certain dataset 204 received for storage in the distributed database 202 is between three and four times the partition size defined for the distributed database 202, the database manager 220 may segment the certain dataset 204 to four data portions, specifically a primary data portion to be stored in a respective primary partition and three additional data portions to be stored in three respective secondary partitions.

As shown at 116, the database manager 220 may write each of the additional data portions of the received dataset 204 in a respective secondary partitions 206B, typically in successive order such that in case the received dataset 204 comprises more than one additional data portions, these additional data portions are stored in successive secondary partitions 206B.

As described herein before, each additional data portion of the received dataset 204 is mapped in the respective secondary partition 206B by a respective identifier (ID) indicating the respective secondary partition 206B. Moreover, since the additional data portions of the received dataset 204 may be stored in successive partitions 206B, the identifiers mapping the successive secondary partitions 206B may be also consecutive.

Optionally, in case the dataset 204 comprises a plurality of additional data portions, the database manager 220 may write concurrently the plurality of additional data portions in the multiple secondary partitions 206B allocated for the dataset 204 which are concurrently accessible.

As shown at 118, the database manager 220 may update the metadata associated with the primary data portion of the received dataset 204 to indicate the identifiers mapping each additional data portion in a respective secondary partition 206B.

As shown at 120, the database manager 220 may write the primary data portion of the received dataset 204 together with its associated metadata in the primary partition 206A.

The database manager 220 may execute the process 100 for storing one or more new datasets 204 received for storage in the distributed database 202, i.e., datasets 204 which are stored in the distributed database 202 for the first time. The database manager 220 may execute the process 100 also for storing one or more update datasets 204 received for storage in the distributed database 202, i.e., datasets which replace corresponding datasets already stored in the distributed database 202.

However, one or more steps of the process 100 may differ when storing an update dataset 204 to replace a corresponding stored dataset 204 compared to storing a new dataset 204 for the first time.

First, when storing a new dataset having only a primary data portion, the database manager 220, in step 112, may write the primary data portion of the new dataset 204 in a respective primary partition 206A allocated from free partitions 206 of the distributed database 202. In contrast, when storing in the distributed database 202 an update dataset having only a primary data portion, the database manager 220, in step 112, may write the primary data portion of the update dataset in the same primary partition 206A storing the primary data portion of the stored dataset 204 thus overwriting and replacing the corresponding stored dataset 204.

Moreover, the database manager 220 may execute one or more other steps of the process 100 differently for storing update datasets 204 having multiple data portions, i.e., a primary data portion and one or more additional data portions compared to execution of these steps for storing new datasets 204 having multiple data portion.

Specifically, when receiving a new dataset 204 comprising multiple data portions for store in the distributed database 202, the database manager 220, in step 116, may write each additional data portion of the new dataset 204 in a respective secondary partition 206B which is free and stores no data of any other dataset 204. In such case, in step 120, the database manager 220 may write the primary data portion of the new dataset 204, together with its metadata indicative of the identifiers of the additional data portion(s), in a respective primary partition 206A in which no data of any other dataset 204 is stored.

However, when receiving an update dataset 204 comprising multiple data portions for store in the distributed database 202, the database manager 220, in step 116, may write each additional data portion of the update dataset 204 in a respective secondary partition 206B different from the secondary partition 206B storing an additional data portion of the corresponding stored dataset 204, specifically a partition 206 which is free and hence not storing data of any other dataset 204. The additional data portion(s) of the update dataset 204 therefore do not overwrite the additional data portion(s) of the corresponding stored dataset 204 which are thus still available in the distributed database 202 at their original secondary partition(s) 206B.

In step 118, the database manager 220 may update the metadata of the primary data portion of the update dataset 204 to indicate the identifiers mapping all additional data portions of the update dataset 204 to their respective secondary partition(s) 206B. In such case, in step 120, the database manager 220 may write the primary data portion of the update dataset 204, together with its metadata, in the same primary partition 206A storing the (old) primary data portion of the replaced dataset 204 to overwrite the old primary data portion.

As described herein before, the database manager 220 may write multiple additional data portions of a new dataset 204 and/or of an update dataset 204 concurrently in a plurality of secondary partitions 206B in case the dataset 204 comprises multiple additional data portions.

Optionally, the database manager 220 may accumulate a plurality of write cycles for adding and/or updating one or more datasets 204 in the distributed database 202. Moreover, the database manager 220 may accumulate the write cycles according to one or more accumulation rules and initiate the accumulated write cycles to the distributed database 202 when one of more of the accumulation rules are fulfilled.

The accumulation rules may define one or more criteria, conditions, and/or parameters for accumulating the write cycles received for adding and/or updating one or more datasets 204 in the distributed database 202. For example, one or more accumulation rules may relate to timing. For example, an exemplary accumulation rule may define a certain timing for accumulating and initiating the write cycles, for example, accumulate write cycles for an hour and initiate them every round hour. In another example, one or more accumulation rules may relate to volume. For example, another exemplary accumulation rule may define a certain number of accumulated write cycles, for example, 10, 100, 1,000, and/or the like such that when the certain number of accumulated write cycles is reached, the accumulated write cycles may be initiated.

Optionally, one or more lock mechanisms, for example, Redlock, semaphore, and/or the like are may be applied for locking the distributed database 202 and/or part thereof when initiating the write cycles to the distributed database 202. Locking the distributed database 202 and/or part thereof may prevent data contention and/or data corruption of one or more datasets 204 stored in the distributed database 202 as result of multiple simultaneously write accesses to the same dataset 204.

Moreover, locking the distributed database 202 and/or part thereof may further prevent data corruption for one or more read accesses (cycles) initiated for fetching one or more datasets 204 stored in the distributed database 202 during one or more write cycles initiated for updating the same datasets 204.

Optionally, the database manager 220 may discard the (old) additional data portions of one or more stored datasets 204, replaced in the distributed database 202 by corresponding update datasets 204, after a predefined time period, for example, 15 seconds, 30 seconds, 60 seconds, 90 seconds, and/or the like. This means that after the predefined time period following an update write cycle, the database manager 220 may delete (remove) the additional portion(s) of the replaced dataset 204 and release (de-allocate) the secondary partitions 206B previously allocated for storing the old additional portion(s).

Allowing some time before discarding the data additional data portions of the replaced dataset 204 may be done to atomically update a dataset 204 stored in the distributed database 202 which is replaced by an update dataset 204 and prevent data corruption for one or more read cycles initiated for fetching one or more datasets 204 during the process of updating the same datasets 204.

Since the additional data portion(s) of an update dataset 204 are not written to overwrite the corresponding (old) additional data portions of the corresponding stored dataset 204 replaced by the update dataset, the old additional data portions are still available for the predefined time. Therefore, a read cycle of a certain dataset initiated during an update write cycle to the same dataset 204 may read the primary data portion of the certain dataset before overwritten with the primary data portion of the update dataset 204. The read cycle may then retrieve the additional data portion(s) of the dataset as mapped by the identifiers extracted from the metadata of the primary data portion, before these additional data portion(s) are discarded.

As such, every read cycle may retrieve a complete, coherent and uncorrupted dataset 204 comprising all the data portions as saved in the distributed database 202 prior to the update write cycle or all the data portions as saved in the distributed database 202 following the update write cycle.

The process 150 executes a read cycle for efficiently retrieving (fetching) one or more datasets 204 stored in the distributed database 202 by taking advantage of the metadata 308A stored in the respective primary partition 206A in association with the primary data portion 306A of the respective stored dataset 204.

For brevity, the process 150 is described for retrieving a single dataset 204 stored in the distributed database 202. This however, should not be construed as limiting since the process 150 may be easily duplicated and/or repeated for reading a plurality of datasets 204 from the distributed database 202.

As shown at 152, the process 150 starts with the database manager 220 receiving a request to retrieve (read) a dataset 204 stored in the distributed database 202.

As shown at 154, the database manager 220 may read the primary data portion of the requested dataset 204 from its respective primary partition 206A.

As shown at 156, the metadata of the database manager 220 may analyze the metadata of the primary portion, which is retrieved together with the primary data portion from the respective primary partition 206A, to determine whether the requested dataset 204 comprises one or more additional data portions.

A shown at 158, which is a conditional step, in case the requested dataset 204 has no additional data portions, the process may branch to 160 and in case the requested dataset 204 has one or more additional data portions, the process may branch to 162.

As shown at 160, since the requested dataset 204 comprises only the primary data portion, the database manager 220 may output the primary data portion of the requested dataset and complete the read cycle.

As shown at 162, since the requested dataset 204 comprises one or more additional data portions stored in one or more respective secondary partitions 206B, the database manager 220 may read the additional data portion(s) of the requested dataset from the respective secondary partition(s) 206B.

In particular, the database manager 220 may extract from the metadata of the primary data portion the identifier(s)

mapping the additional data portion(s) to the respective secondary partition(s) 206B and access the secondary partition(s) 206B accordingly.

Optionally, in case the requested dataset 204 comprises multiple additional data portions stored in multiple secondary partitions 206B, the database manager 220 may read concurrently the additional data portions from the multiple secondary partitions 206B.

As shown at 164, the database manager 220 may merge the primary data portion read in step 154 and the additional data portions read in step 162 to reconstruct the requested dataset and output the requested (merged) dataset 204 to complete the read cycle.

Read accesses for fetching datasets 204 from the distributed database 202 are typically conducted through queries initiated by one or more database clients to the database manager 220 as known in the art. Such queries may be received via the I/O interface 210 of the database system 200, for example, via one or more networks, interconnections and/or the like. Each query may comprise one or more query keys which may be matched against datasets 204 stored in the distributed database 202 to identify datasets 204 matching the query. The database manager 220 may output the retrieved datasets 204 by responding to the queries as known in the art and transmitting the retrieved datasets 204 via the I/O interface 210.

Figure 4:
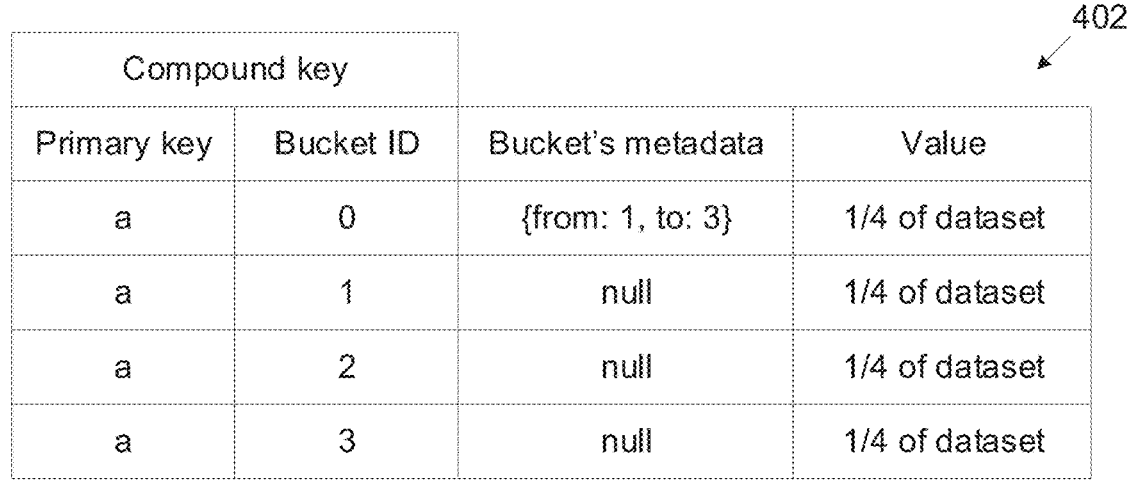
FIG. 4 is a schematic illustration of mapping an exemplary dataset segmented across multiple partitions of a distributed database comprising a plurality of partitions, according to some embodiments of the present invention.
Figure 4:
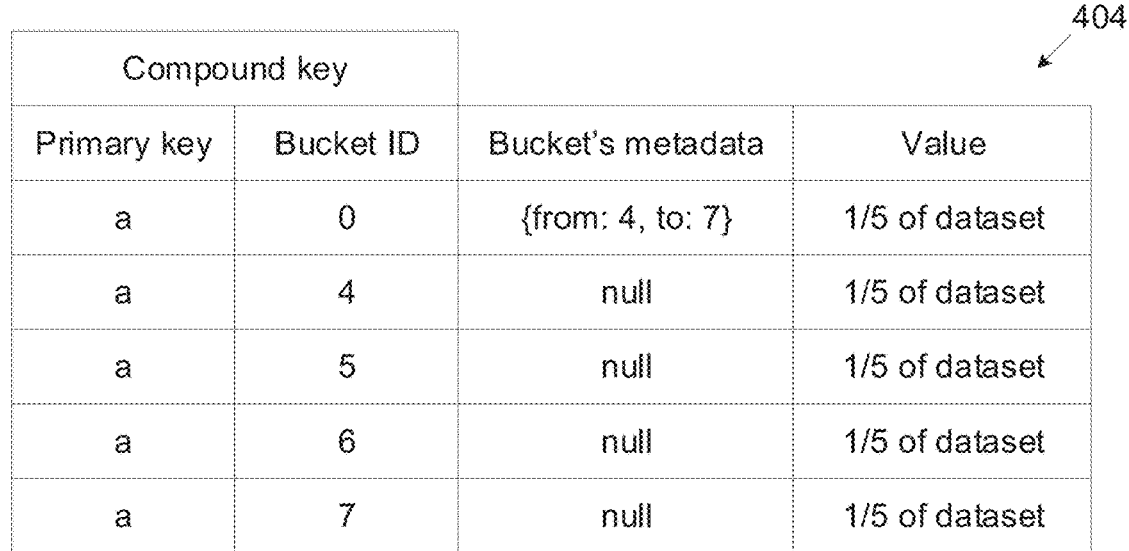

Reference is now made to FIG. 4, which is a schematic illustration of mapping an exemplary dataset segmented across multiple partitions of a distributed database comprising a plurality of partitions, according to some embodiments of the present invention.

A distributed database such as the distributed database 202 may comprise a plurality of partitions such as the partitions 206 allocated for storing datasets such as the datasets 204. The partitions 206 designated buckets herein after may each have a predefined size.

For example, a certain dataset 204 may be split into N data portions which may be stored in N buckets such that each of the N buckets may hold 1/N of the respective dataset.

As described herein before for the partitions 206, the plurality of buckets may be distinct and independent of each other such that multiple and possible all buckets may be accessed concurrently. Moreover, each of the plurality of buckets may be queried using one or more query keys as known in the art.

Each dataset 204 may be stored in one or more buckets allocated in the distributed database 202 according to its size compared to the size of the buckets (partition size), specifically each dataset 204 may be stored in a primary bucket designated bucket 0 and one or more of a plurality of N−1 secondary buckets, designated buckets 1, 2, 3, 4, 5, 6, 7, and so on.

An identifier 'Bucket ID' and metadata 'Bucket's metadata' columns may be added to each dataset 204 stored in the distributed database 202, specifically a metadata may be added to each data portion of each dataset 204 stored in one of the buckets. The 'Bucket ID' and metadata 'Bucket's metadata' columns are stored with each data portion in the same partition 206 as the respective data portion.

As described herein before, all datasets 204 have at least a single data portion, namely the primary data portion stored in a respective bucket (0). Most of the datasets 204 have only this single primary data portion and their 'Bucket's metadata' may be therefore empty (e.g., null) indicating the dataset 204 has not additional data portions.

Larger datasets 204 which require more than a single bucket for storing them in the distributed database 202 may comprise multiple data portions, specifically a primary data portion and one or more additional data portions as described herein before in detail. The metadata of the primary data portion of such datasets 204 may comprise the IDs of the additional data portions mapping the additional data portions in the secondary buckets, for example, a range of those IDs which are typically consecutive as described herein before. The 'Bucket's metadata' of the additional data portions may be empty (e.g., null).

A mapping table 402 of a certain dataset 204, for example, an entry (row) stored in the distributed database 202 indicates that the certain dataset 204 comprises four data portions stored in multiple buckets of the distributed database 202. Specifically mapping table 402 indicates that the dataset 204 comprises a primary data portion stored in a respective primary bucket (0), a first additional data portion stored in a respective first secondary bucket (1), a second additional data portion stored in a respective second secondary bucket (2), and a third additional data portion stored in a respective third secondary bucket (3). As seen, all of the data portions of the certain dataset 204 are associated with an exemplary primary query key 'a'.

Accordingly, the metadata 'Bucket metadata' of the primary data portion which is also stored in the respective primary bucket (0) in association with the primary data portion may comprise identifiers (ID) mapping the three additional data portions of the certain dataset 204 stored in the respective secondary buckets, for example, the range of respective secondary buckets (1) to (3).

It should be noted that while the IDs of the additional data portions may be consecutive, since the primary data portion is always stored in a respective primary bucket (0), the IDs of the additional data portions may not be sequential, and may comprise, for example, IDs (0), (5), (6), (7).

Optionally, the dataset 204 described by the mapping table 402 may be associated with a compound key comprising one or more data items which may be used to track, identify, query and/or access the dataset 204, for example, an account ID, a board (table) ID, a column ID, etc., and/or a combination thereof.

A read access for retrieving a dataset 204 from the distributed database 202 according to a certain query key, for example, the primary key 'a', may be executed, for example, by a database manager such as the database manager 220 executing the process 150.

The database manager 220 may query the primary bucket '0' with a query key (primary key='a' AND Bucket ID=0), annotated ('a', 0) for brevity and retrieve the primary data portion stored in the respective primary bucket '0' together with its metadata. The database manager 220 may analyze the metadata 'Bucket metadata' of the primary data portion retrieved from the bucket (0) and may determine that additional queries are required to retrieve the additional data portions of the dataset 204, in this case three additional queries ('a', 1), ('a', 2), and ('a', 3). After retrieving the additional data portions, the database manager 220 may merge them with the primary data portion to reconstruct the complete dataset 204 and respond to the query with the merged dataset 204.

When updating the dataset 204 stored in the database which is mapped by mapping table 402 with an update dataset, a process and/or an algorithm such as the process 100 may be initiated, for example, by the database manager 220 for replacing the stored (old) dataset with an update (new) dataset.

The update dataset 204 may be split, for example, by the database manager 220, to a plurality of data portions, specifically a primary data portion and one or more additional data portions. The number of data portions of the update dataset 204 may not be necessarily the same as the number of data portions of the stored dataset 204 which is to be replaced with the update dataset. For example, while the stored dataset 204 has four data portions stored in the respective primary bucket and three respective secondary buckets, the update dataset 204 may comprise a different number of data portions for example, five data portions.

The database manager 220 may then find free secondary buckets which are not in use and therefore available for storing the additional data portions of the update dataset 204, specifically, secondary buckets which are different from the buckets in which the additional data portions of the old dataset 204 are stored.

The database manager 220 may then write the additional data portions of the update dataset 204 in the respective secondary buckets identified as free and available and may map them accordingly with respective new Bucket IDs. As such, the (new) additional data portions of the update dataset 204 are written in different buckets from those storing the additional data portions of the old corresponding dataset 204 thus the new additional data portions do not overwrite the old additional data portions and both sets (new and old) of additional data portions exist at least until the old additional data portions are discarded.

After writing the additional data portions to the secondary buckets, the database manager 220 may write the primary data portion of the update dataset 204 in the primary bucket (0). Specifically, the database manager 220 overwrites the primary data portion of the (old) dataset 204 stored in the primary bucket (0) with the primary data portion of the update dataset 204.

As described herein before, the database manager 220 may write the primary data portion of the update dataset 204 in the primary bucket (0) together with its metadata which is updated to indicate the new bucket IDs mapping the additional data portions of the update dataset database in the respective secondary buckets.

The new mapping of the dataset 204 after updated in the distributed database 202 are reflected in mapping table 404 which indicates that the updated dataset 204 now comprises five data portions stored in multiple buckets of the database. Specifically, the mapping table 404 indicates that the dataset 204 comprises a primary data portion stored in a respective primary bucket (0), a first additional data portion stored in a respective secondary bucket (4), a second additional data portion stored in a respective secondary bucket (5), a third additional data portion stored in a respective secondary bucket (5), and a fourth additional data portion stored in a respective secondary bucket (7). As before, all data portions of the updated dataset 204 are associated with the exemplary primary query key 'a'.

Accordingly, the metadata 'Bucket metadata' of the primary data portion which is also stored in the respective primary bucket (0) in association with the primary data portion may comprise the IDs mapping the four additional data portions of the certain dataset 204 stored in the respective secondary buckets, for example, the range of secondary buckets (4) to (7).

This dataset update algorithm executed, for example, by the database manager 220, is an atomic operation ensuring that read (query) accesses to any dataset 204, including during the time of update, may retrieve a complete dataset 204 as a whole, either the complete previous dataset 204 as stored before the update process, or the complete new dataset 204 as stored after the update process.

Continuing the previous example, the algorithm may guarantee that during the multi-buckets update, every read access initiated by one or more database clients for reading the dataset 204 would get all the data portions from the old buckets (0, 1, 2, 3). After the update process completes, the dataset 204 retrieved from the new buckets (0, 4, 5. 6, 7) are available as a whole unit together, and there is therefore no race condition risk that a client may fetch incomplete data during the update process. In other words, since the new additional data portions do not overwrite the old additional data portions, every read access may fetch either the complete old dataset 204, if the read is initiated before the primary portion of the new datasets 204 is written in the primary bucket, of the complete new dataset 204, if the read is initiated after the primary portion of the new datasets 204 is written in the primary bucket.

During the update process until the primary data portion of the old dataset is overwritten by the new primary data portion in the primary bucket (0), every read (query) access made by a client to the database with query key 'a' may first retrieve the old primary data portion of the dataset 204 and its metadata indicating the three additional data portions stored in secondary buckets (1), (2), and (3). The read access may therefore query these three secondary buckets with the query key 'a' to retrieve the three additional data portions of the dataset 204.

However, in case a read (query) access is made by a client to the distributed database 202 with query key 'a' after the primary data portion of the dataset 204 is updated in the primary bucket (0), the read access may retrieve the new primary data portion of the dataset 204 and its metadata indicating the four additional data portions stored in secondary buckets (4), (5), (6), and (7). The read access may therefore query these four secondary buckets with the query key 'a' to retrieve the four additional data portions of the dataset 204.

As described herein before, the additional data portions of the replaced datasets 204 stored in the secondary buckets (1), (2), and (3) may be discarded after a predefined time period thus releasing the secondary buckets (1), (2), and (3) to the pool of partitions 206 of the distributed database 202 and may be used for storing one or more other datasets 204.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms storage unit and database are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for improving access performance to a distributed database, comprising:
    a memory storing a distributed database comprising a plurality of partitions for storing a plurality of datasets; and
    at least one non-transitory persistent storage device, storing executable code;
    at least one processor that when executing said stored executable code, conducts the steps of:
        partitioning each dataset received for storing in the distributed database to at least a primary data portion and at least zero additional data portions, wherein said partitioning of each dataset is conducted according to a size of the respective dataset;
        writing the respective primary data portion of the respective dataset in a respective primary partition of the plurality of partitions allocated for the respective dataset;
        writing each additional data portion of the respective dataset in a respective secondary partition of the plurality of partitions allocated for the respective dataset, wherein each additional data portion of each dataset is mapped to a respective secondary partition, in which it is stored, by a respective identifier; and
        updating metadata of the primary data portion of the respective dataset to include the identifier of each of all additional data partitions of the respective dataset, the metadata, which contains identifiers of all of the additional data partitions of the respective dataset, is stored in the respective primary partition allocated for the respective dataset in association with the primary data portion of the respective dataset, wherein said identifiers are not stored in the additional partitions, such that upon reading the primary partition of a dataset, a number and location in memory of secondary partitions of the respective dataset, if any, is provided without performing an additional reading;
    wherein the size of the dataset is provided upon performing a read operation to the respective primary partition of the respective dataset.

2. The system of claim 1, wherein the respective identifier of the primary data portion of the respective dataset mapping the respective primary data portion to a respective primary partition further serves as an identifier of the entire respective dataset.

3. The system of claim 1, wherein each of the plurality of partitions is allocated a predefined size for storing a respective data portion of a respective dataset.

4. The system of claim 1, wherein the plurality of partitions are deployed across a plurality of concurrently accessible clusters such that multiple data portions of a respective dataset are accessible concurrently.

5. The system of claim 1, wherein the additional data portions of a respective dataset are stored in consecutive partitions.

6. The system of claim 1, wherein a read cycle for fetching a respective dataset from the distributed database comprises:

reading, in a single query, an entirety primary partition of the respective dataset including the primary data portion and the metadata stored therein, responsive to detecting that the metadata does not comprise any identifier, completing the read cycle, and responsive to detecting that the metadata comprises at least one or more identifiers, reading all of the additional data portions of the respective dataset from the respective secondary partitions according to the one or more identifiers.

7. The system of claim 6, wherein in case the respective dataset comprises a plurality of additional data portions, the plurality of additional data portions are read concurrently from multiple respective second partitions.

8. The system of claim 1, wherein a write cycle for storing a new dataset to the distributed database comprises:

determining, based on a size of the new dataset, whether the new dataset comprises a single data portion or a plurality of data portions, responsive to determining that the new dataset comprises a single data portion, storing the new dataset by:
updating metadata of a primary data portion of the new dataset to indicate the new dataset has no additional data portions, and
writing the primary data portion including its metadata in a respective primary partition allocated for the new dataset, and responsive to determining that the new dataset comprises a plurality of data portions, storing the new dataset by:
writing each additional data portion of the new dataset in a respective secondary partition of the plurality of partitions allocated for the new dataset, each additional data portion of the new dataset is mapped to the respective secondary partition by a respective identifier,
updating the metadata of the primary data portion of the new dataset to include the identifier of each additional data portion of the new dataset, and
writing the primary data portion including its metadata in the respective primary partition.

9. The system of claim 8, wherein in case the new dataset comprises a plurality of additional data portions, the plurality of additional data portions are written concurrently to multiple respective secondary partitions.

10. The system of claim 8, wherein updating metadata of the primary data portion of the new dataset to indicate the new dataset has no additional data portions comprises entering a null value as metadata.

11. The system of claim 1, wherein a write cycle for updating a respective dataset stored in the distributed database with an update dataset comprises:

determining, based on a size of the update dataset, whether the update dataset comprises a single data portion or a plurality of data portions, responsive to determining that the update dataset comprises a single data portion, storing the update dataset by:
updating metadata of a primary data portion of the update dataset to indicate the update dataset has no additional data portions, and
writing the primary data portion including its metadata in a respective primary partition storing the stored dataset to overwrite the stored dataset, and responsive to determining that the updated dataset comprises a plurality of data portions, storing the update dataset by:
writing each additional data portion of the update dataset in a respective one of a plurality of secondary partitions allocated for the update dataset which is different from the respective secondary partition storing an additional data portion of the stored dataset, the respective additional data portion of the updated dataset is mapped to the respective different secondary partition by a respective new identifier,
updating metadata associated with the primary data portion of the update dataset to indicate the new identifier of each additional data portion of the update dataset, and
writing the primary data portion of the update dataset including its associated metadata in the respective primary partition storing the stored dataset to overwrite the primary data partition of the stored dataset.

12. The system of claim 11, wherein in case the update dataset comprises a plurality of additional data portions, the plurality of additional data portions are written concurrently to multiple respective secondary partitions.

13. The system of claim 11, wherein the additional portions partitions of the stored dataset are discarded after a predefined time period to release the respective secondary partitions.

14. The system of claim 11, further comprising accumulating a plurality of write cycles for updating at least one dataset stored in the distributed database according to at least one accumulation rule and initiating the accumulated write cycles when the at least one accumulation rule is fulfilled.

15. The system of claim 14, wherein the at least one accumulation rule defines a certain timing for accumulating write cycles.

16. The system of claim 14, wherein the at least one accumulation rule defines a certain number of accumulated write cycles.

17. The system of claim 14, further comprising applying at least one lock mechanism during each of the accumulated write cycles to prevent simulations access of multiple write cycles to a common dataset.

18. The system of claim 1, wherein each of the primary partitions may contain up to a single dataset and each of the secondary partitions may contain less than a single dataset.

19. A computer implemented method for improving access performance to a distributed database in storing datasets in the distributed database, comprising:

receiving a plurality of datasets for store in a distributed database deployed comprising a plurality of partitions allocated in memory for storing a plurality of datasets;

segmenting each of the plurality of datasets to a respective primary data portion and at least zero respective additional data portions according to a size of the respective dataset;

writing the respective primary data portion of the respective dataset in a respective primary partition of the plurality of partitions allocated for the respective dataset;

writing each additional data portion of the respective dataset in a respective secondary partition of the plurality of partitions allocated for the respective dataset, each additional data portion is mapped to the respective secondary partition by a respective identifier; and updating the metadata of the primary data portion of the respective dataset to include the identifiers of each of the at least zero respective additional data portions of the respective dataset, the metadata, which contains identifiers of all of the additional data partitions of the respective dataset, is stored in the respective primary partition allocated for the respective dataset in association with the primary data portion of the respective dataset;

wherein said metadata is stored in said primary partition and not in any of said secondary partitions.

20. A non-transitory computer readable medium containing instructions that when executed by at least one processor cause the at least one processor to perform operations for retrieving datasets from a distributed database stored on a memory, the operations comprising:

in response to a read request for a first dataset:
perform a first reading operation on a first primary data portion of a first primary partition of the first dataset;
determine that a metadata of the first primary data portion contains no indicators for secondary partitions; and
return the primary data portion as the first dataset; and in response to a read request for a second dataset:
perform a second reading operation on a second primary data portion of a second primary partition of the second dataset;
determine that a metadata of second primary data portion contains one or more indicators for secondary partitions of said second dataset, wherein the one or more indicators for said secondary partitions are contained in the metadata of the second primary data portion, said metadata of the second primary data portion is stored in the second primary partition allocated for the second dataset, wherein said indicators are not stored in the secondary partitions; and
perform a third reading operation on a number of secondary partitions corresponding to a number of the determined one or more indicators for secondary data portions;
return the primary data portion and the one or more secondary data portions as the second dataset;

wherein prior to each of the first and second reading operations, a number of secondary partitions of the respective dataset was unknown.

* * * * *